(12) United States Patent
Krapf et al.

(10) Patent No.: US 8,935,000 B2
(45) Date of Patent: Jan. 13, 2015

(54) MACHINE TOOL MONITORING DEVICE

(75) Inventors: Reiner Krapf, Reutlingen (DE); Heiko Braun, Leinfelden-Echterdingen (DE); Michael Mahler, Leinfelden-Echterdingen (DE); Alexander Werner Hees, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 585 days.

(21) Appl. No.: 12/439,648

(22) PCT Filed: Aug. 31, 2007

(86) PCT No.: PCT/EP2007/059104
§ 371 (c)(1),
(2), (4) Date: Mar. 2, 2009

(87) PCT Pub. No.: WO2008/028868
PCT Pub. Date: Mar. 13, 2008

(65) Prior Publication Data
US 2010/0018830 A1    Jan. 28, 2010

(30) Foreign Application Priority Data

Sep. 4, 2006  (DE) .......................... 10 2006 041 759
Aug. 22, 2007 (DE) .......................... 10 2007 039 570

(51) Int. Cl.
*G06F 19/00* (2011.01)
*B60Q 1/00* (2006.01)
(Continued)

(52) U.S. Cl.
CPC ............... *F16P 3/14* (2013.01); *B23Q 11/0082* (2013.01); *B23Q 17/20* (2013.01); *G01S 7/411* (2013.01); *G01S 13/0209* (2013.01); *G01S 13/04* (2013.01); *G01S 13/88* (2013.01)
USPC ..... 700/174; 340/435; 340/572.1; 340/686.6; 342/21; 342/22; 375/130; 375/132; 83/72

(58) Field of Classification Search
CPC ...................................... G06K 17/00
USPC ................... 83/72; 700/174, 17; 702/163, 27; 375/130, 132, 138, 239, 295; 340/435, 340/686.6, 572.1, 505, 573.7, 575; 343/700, 900; 342/21, 22, 27, 28, 72
See application file for complete search history.

(56) References Cited

U.S. PATENT DOCUMENTS 4,563,897 A  *  1/1986  Moore ............................ 73/587
4,724,524 A  *  2/1988  Thomas et al. ............... 700/175
(Continued)

FOREIGN PATENT DOCUMENTS

EP    1 233 231 A2   8/2002
EP    1 422 022      5/2004
(Continued)

OTHER PUBLICATIONS

ETSI et al: "Object discrimination and characterization applications operating in the frequency band 2, 2GHz to 8 GHz" ETSI Standards, European Telecommunications Standards Institute, Sophia-Antipo, FR. vol. DTRERM-RM, Nr. 44-2, v 1.1.1, May 2006, XP002459104, pp. 10-11, 17-20.

*Primary Examiner* — Ryan A. Jarrett
*Assistant Examiner* — Darrin Dunn
(74) *Attorney, Agent, or Firm* — Maginot, Moore & Beck LLP

(57) ABSTRACT

The invention relates to a machine tool monitoring device. It is proposed that the machine tool monitoring device comprises at least one signal unit for an ultra wide band operation.

20 Claims, 9 Drawing Sheets

(51) Int. Cl.
*G08B 13/14* (2006.01)
*G08B 21/00* (2006.01)
*G01S 13/00* (2006.01)
*H04B 1/00* (2006.01)
*B23Q 15/00* (2006.01)
*F16P 3/14* (2006.01)
*B23Q 11/00* (2006.01)
*B23Q 17/20* (2006.01)
*G01S 7/41* (2006.01)
*G01S 13/02* (2006.01)
*G01S 13/04* (2006.01)
*G01S 13/88* (2006.01)

(56) References Cited

U.S. PATENT DOCUMENTS

| | | | | |
|---|---|---|---|---|
| 4,771,665 | A * | 9/1988 | Van Doorn et al. | 83/62.1 |
| 5,043,907 | A * | 8/1991 | Richards | 700/167 |
| 5,049,884 | A * | 9/1991 | Jaeger et al. | 342/20 |
| 5,389,939 | A * | 2/1995 | Tang et al. | 343/754 |
| 7,047,854 | B2 * | 5/2006 | Sako | 83/58 |
| 7,084,779 | B2 * | 8/2006 | Uneyama | 340/680 |
| 7,137,287 | B2 | 11/2006 | Wu | |
| 7,421,932 | B1 * | 9/2008 | Heinzmann et al. | 83/58 |
| 2001/0001149 | A1 * | 5/2001 | Alouani et al. | 706/906 |
| 2002/0017178 | A1 * | 2/2002 | Gass et al. | 83/58 |
| 2002/0171993 | A1 | 11/2002 | Mather et al. | |
| 2002/0186299 | A1 * | 12/2002 | Cofer | 348/152 |
| 2003/0107512 | A1 * | 6/2003 | McFarland et al. | 342/159 |
| 2003/0131703 | A1 * | 7/2003 | Gass et al. | 83/62.1 |
| 2003/0163286 | A1 * | 8/2003 | Yasugi | 702/185 |
| 2003/0217047 | A1 * | 11/2003 | Marchisio | 707/3 |
| 2004/0200329 | A1 * | 10/2004 | Sako | 83/58 |
| 2005/0057206 | A1 * | 3/2005 | Uneyama | 318/365 |
| 2005/0216106 | A1 * | 9/2005 | Maenner | 700/79 |
| 2005/0240377 | A1 * | 10/2005 | Bibelhausen et al. | 702/188 |
| 2005/0267624 | A1 * | 12/2005 | Kita et al. | 700/175 |
| 2006/0000332 | A1 * | 1/2006 | Sako | 83/477.2 |
| 2006/0096425 | A1 | 5/2006 | Keller | |
| 2006/0101960 | A1 | 5/2006 | Smith et al. | |
| 2006/0106546 | A1 * | 5/2006 | Roberts et al. | 702/27 |
| 2006/0197020 | A1 * | 9/2006 | Trzecieski et al. | 250/342 |
| 2006/0225551 | A1 * | 10/2006 | Gass | 83/76.8 |
| 2007/0016326 | A1 * | 1/2007 | Tsuji et al. | 700/176 |
| 2007/0045257 | A1 * | 3/2007 | Moor et al. | 219/121.83 |
| 2007/0194944 | A1 * | 8/2007 | Galera et al. | 340/686.6 |
| 2007/0240786 | A1 * | 10/2007 | Gass et al. | 144/420 |
| 2007/0257788 | A1 * | 11/2007 | Carlson et al. | 340/506 |
| 2008/0088499 | A1 * | 4/2008 | Bonthron et al. | 342/104 |
| 2009/0126711 | A1 * | 5/2009 | Gomez | 125/15 |
| 2011/0054712 | A1 * | 3/2011 | Baraty | 700/291 |

FOREIGN PATENT DOCUMENTS

| | | |
|---|---|---|
| JP | 2004-4100 | 1/2004 |
| JP | 2004160822 | 6/2004 |
| JP | 2006-527842 | 12/2006 |
| WO | WO 94/24579 | 10/1994 |
| WO | WO2005/081015 | 9/2005 |
| WO | WO 2007/054529 | 5/2007 |
| WO | WO 2008013515 A2 * | 1/2008 |

* cited by examiner

MACHINE TOOL MONITORING DEVICE

TECHNICAL FIELD

The invention is based on a machine tool monitoring device according to the generic term of claim 1.

BACKGROUND

A machine tool monitoring device for a circular saw is know from DE 102 61 791 A1. It provides a sensor unit for producing and detecting an electromagnetic signal, which is arranged close to a saw blade. An approaching of a body part to the saw blade can be detected by monitoring the signal spectrum. A license free band is selected as frequency band for the signal.

SUMMARY

The invention is based on a machine tool monitoring device.

It is suggested that the machine tool monitoring device has at least one signal unit provided for an ultra wide band operation. By using ultra wide band signals a high information concentration and thereby an effective monitoring can be achieved. In particular several work parameters can be monitored simultaneously at an application of a machine tool, whereby secure and comfortable working conditions can be achieved. Furthermore a very accurate material distinction can be achieved. The wide bandwidth of transmitting signals allows furthermore an accurate detection of a distance of the signal unit to an object that is in a monitored area. The determination of a work piece dimension, in particular a work piece thickness, is also possible. A signal unit that is provided for an "ultra wide band operation" means in particular a unit, with which an ultra wide band signal can be produced, received and/or evaluated. An "ultra wide band signal" means in particular a signal, which provides a frequency spectrum with a center frequency and a frequency band width of at least 500 MHz. The center frequency is preferably chosen in the frequency range of 1 GHz to 15 GHz. It is especially suggested that the signal unit provides at least one ultra wide band radar sensor, whereby an arrangement of the sensor unit can be achieved that is space-saving and unobtrusive. An "ultra wide band radar sensor" means in this context a radar sensor, with which an ultra wide band radar signal can be produced, transmitted and/or received. Furthermore the word "provided" means in particular "construed", "equipped" and/or "programmed".

In particular the signal unit is construed as a detection unit for detecting an application situation at a machine tool. It is suggested in a preferred embodiment of the invention that the signal unit, especially the ultra wide band radar sensor, is provided for detecting human or animal tissue in a monitored area, preferably in a danger zone that is assigned to a driven tool of the machine tool, whereby a high operating security can be achieved at the application of the machine tool. That can be reliably achieved in particular by the evaluation of an ultra wide band radar signal, because such a tissue has a high damping effect in a frequency range above 2 GHz. The machine tool monitoring device provides furthermore an actuator engineering unit for carrying out a security measure, which has a functional connection with the signal unit. This actuator engineering unit is in particular provided to eliminate the presence of a tool in the danger zone that is driven to a movement by a signal of the signal unit. Hereby "eliminating" means a switching off of the tool drive or the shifting of the driven tool from the danger zone. The "danger zone" preferably consists of points, which provide a smallest distance to the driven tool of maximally 5 cm, in particular maximally 2 cm.

A particularly constructively simple monitoring can be achieved if the at least one ultra wide band radar sensor is arranged in a machine tool basic assembly position below a machine tool work surface for placing a work piece. A "machine tool basic assembly position" means in this context a position, which is present at the application of the machine tool by an end user according to the instructed application conditions.

An increased flexibility in the application of the machine tool monitoring device can be achieved if it provides at least one further sensor. It is in particular suggested that the at least one further sensor is designed as an ultra wide band radar sensor, whereby an advantageous complementarity with the first ultra wide band sensor can be achieved. An increased statement quality about a material status (as for example a degree of humidity) of a work piece and at the detection of human or animal tissue can be achieved in particular by an additional ultra wide band radar sensor.

A complementarity of at least two sensor types can be advantageously used if the at least one further sensor is a capacitive or inductive or mechanic or optical sensor. The at least one further sensor can be construed in this context especially advantageously for preventing a false trip of an actuator engineering unit that is connected with the signal unit. The at least one further sensor can be designed for example as image acquisition unit or for evaluating a temperature parameter, as for example when construed as an infrared sensor.

It is suggested in a further embodiment of the invention that the at least one further sensor is arranged in a machine tool basic assembly position above a machine tool work surface for placing a work piece. A big monitoring range can be thereby achieved. Furthermore an advantageous monitoring can be achieved with this arrangement when processing a work piece that is made of metal, which is usually affected due to the impermeability for high frequency signals of the work piece. Furthermore an advantageous evaluation of a signal part of a transmitting signal that is reflected on a work piece can be achieved. A signal part that is reflected on the work piece can especially be used advantageously for a material detection, as for example by the evaluation of the phase position of the reflected part in relation to the transmitting signal.

It is furthermore suggested that the at least one ultra wide band radar sensor and the at least one further sensor are arranged in a machine tool basic assembly position on both sides of a machine tool work surface for placing a work piece, whereby a particularly big monitoring range can be achieved. By arranging the sensors "on both sides" of the machine tool work surface the sensors are preferably separated by the machine tool work surface, whereby a first sensor is arranged below and a second sensor above the machine tool work surface.

It is suggested in an advantageous improvement of the invention that the at least one ultra wide band radar sensor and the at least one further sensor create a sensor system, which is construed for detecting at least two signal parts, which provide two different radiation directions due to an interaction with a monitored object, whereby the reliability of the monitoring can be advantageously increased.

It is especially suggested that the at least one ultra wide band radar sensor and the at least one further sensor create a sensor system, which is construed for detecting a signal part that is transmitted by a processed work piece and a signal part that is reflected on a processed work piece. Thereby a particularly big monitoring range and therefore a high security can be achieved.

In this context the flexibility, the reliability and the operating comfort are further increased by avoiding false trips of security measures, if the machine tool monitoring device provides a sensor in addition to the sensor system. That sensor can be a capacitive or inductive or mechanic or optical sensor or it can be a further ultra wide band radar sensor.

Furthermore specific areas of the machine tool, which represent a particular danger, can be monitored purposefully with a high signal intensity, if the machine tool monitoring device provides a unit, which is construed for bundling a radiation of the signal unit.

It is also suggested that the signal unit provides a tool, which determines a duty cycle for a transmitting signal in at least one energy saving mode, whereby an energy consumption and failures of further services can be advantageously reduced. A "duty cycle" means a relation between the first or the second duration and the entire cycle period at the transmission of a transmitting signal in a cyclic process, at which the transmitting signal is transmitted alternately during a first duration with an intensity and during a second duration with a smaller intensity, in particular with a zero intensity. The first and the second duration create hereby the entire cycle period. During the first or the second duration the transmitted signal itself can be construed as periodic signal.

It is suggested in a further embodiment of the invention that the signal unit has a listen-before-talk function, whereby a reciprocal failure of the signal unit can be advantageously reduced with an external services. A "listen-before-talk function" means in particular an operating mode of the machine tool monitoring device, in which the relevant useful frequency range of the signal unit is searched for external services. The useful frequency range is in particular searched for radio-, GMS-, UMTS- and/or flight radar services.

It is furthermore suggested that the signal unit is construed for processing a signal, which provides a series of pulses. Thereby bigger frequency bandwidths can be achieved. When processing the signal the signal can be especially produced, received and/or evaluated. A "series" of pulses means in particular a number of timely sequenced pulses. A pulse can be created by a specific pattern, as for example a rectangular, a gauss profile and so on, in an illustration of the signal amplitude against the time. A pulse duration or a parameter that characterizes the transmitting duration of the pattern is preferably selected in the range of 0.1 ns (nanosecond) to 2 ns. Within the series the pulses can follow each other consecutively because the time interval between two directly subsequent pulses is constant. Alternatively the pulses can follow each other timely irregularly. The time interval between two directly subsequent pulses can thereby be construed as coincidence variable. The series can for example be carried out as PN-series (pseudo-noise-series).

Alternatively or additionally the signal unit can be provided for processing a signal, which is modulated in the frequency like especially of a FMCW-signal (frequency modulated continuous wave). It is in particular suggested that the signal unit is provided for creating a signal by a stepped frequency modulation. A "stepped" frequency modulation means a modulation of the signal, at which the frequency of the signal is changed stepwise, in contrast to a continuous change of the frequency, based on a first frequency value up to a second frequency value. Therefore at least one oscillator is provided, at which the initial frequency is controllable. The first frequency value and the second frequency value span preferably an ultra wide band frequency range.

Advantageously the signal unit comprises an arithmetic unit, which is provided to assign a detected signal to an application situation by a signal processing that is based on a fuzzy and/or neuronal logic. With the aid of a fuzzy logic a big and complex information amount can be quickly be evaluated by the arithmetic unit by the detected signal. The machine tool monitoring device can thereby react upon situations in a short period of time, which assigns the occurrence of a specific event to a probability value in the interval between 0 (false) and 1 (true). In distinction from capacitive sensors it can thereby be reacted upon a critical application situation before a physical contact between the operator and the machine tool occurs. By a neuronal logic advantageous self-learning functions of the machine tool monitoring device can be achieved.

It is suggested in an advantageous improvement of the invention that the signal unit provides a data base, in which an application situation is assigned to at least one signal pattern. A particularly quick detection process of an application situation can be advantageously achieved by checking a correlation between a detected signal and a signal pattern. Thereby a correlation method can be advantageously used that is based on a fuzzy logic.

It is suggested in a further embodiment of the invention that the signal unit provides a programmable data base, in which an application situation at a processing is assigned to a method for changing the processing process. If a specific application situation is detected it can thereby be reacted upon this application situation in a short period of time. The data base is preferably programmable in mounted status of a machine tool and especially by an operator of this machine tool. The assembly positions of the data base can thereby be expanded for example if the machine tool is updated with further tools or further equipment by an operator.

The signal unit is preferably provided for determining a work progress at a work piece processing. A high operating comfort can be thereby achieved at the application of a machine tool. Advantageously different work phases can be defined at a work piece processing, whereby a security level is adjusted to these work phases at the monitoring of the work piece processing.

If the signal unit is provided for determining a distance, a position of a tool or work piece can be advantageously monitored at a work piece processing. For example abnormal positions can be quickly detected like for example an imbalance of the tool or at a wrong placing of a work piece. Additionally a dimension of a work piece can be determined. Advantageously a work progress can be monitored.

Preferably the signal unit is provided for determining a speed of processed work piece. Thereby a work progress can be advantageously monitored. The signal unit is preferably provided for determining a translation- and/or rotation speed of the work piece in relation to a static unit of a machine tool, as for example a housing.

It is suggested in this context that the signal unit provides a tool that is provided for determining a speed of a work piece and/or a tool by an evaluation of a double displacement of a signal that is produced by a signal unit. Thereby an actual rotation speed of a tool and/or the progress speed of a processing progress at a work piece can be particularly precisely determined.

In a further embodiment of the invention the machine tool monitoring device provides an electronic output unit, which is provided for the output of monitoring information to an operator, whereby security and operating comfort can be further increased at the application. The output unit can be construed as display, as for example as LED- or LCD-display.

Alternatively or additionally the output unit can be provided for example the output of an acoustic signal.

If the machine tool monitoring device provides an electronic input unit, which is provided for the input of at least one monitoring information, a configuration of monitoring functions can be carried out by an operator.

If the machine tool monitoring device provides a regulating unit, which is provided for regulating at least one parameter of a work piece processing progress, a work quality can be advantageously increased.

It is suggested in a further embodiment that the signal unit serves in at least one operating mode for evaluating at least one radiation from a group of at least two radiation parts, which are spatially separated from each other due to a reflection of a signal at least two interfaces of a medium. The signal unit can hereby especially determine the dielectric constant and/or the thickness of the medium by the evaluation.

BRIEF DESCRIPTION OF THE DRAWINGS

Further advantages arise from the following drawing description. Embodiments of the invention are shown in the drawing. The drawing, the description and the claims contain various features in combination. The expert will consider these features also individually and put them together into useful further combinations.

It is shown in.

DETAILED DESCRIPTION

Figure 1:
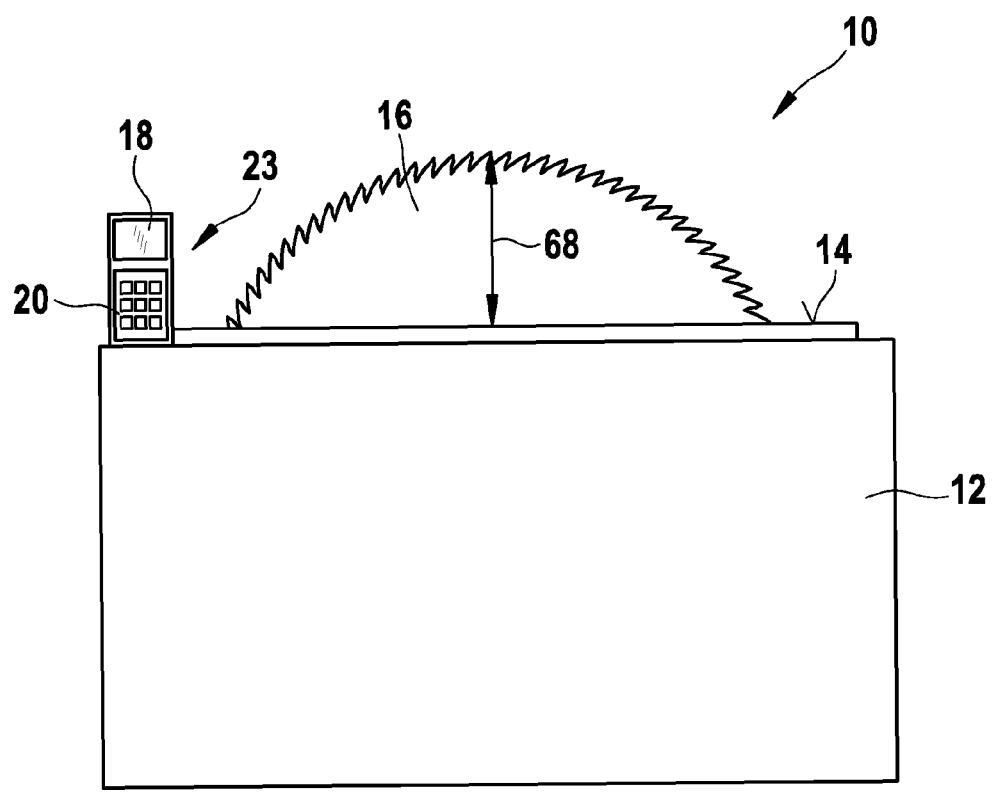
FIG. 1 is a circular saw with a saw blade and an input/output unit in a side view.

FIG. 1 shows a machine tool that is designed as a circular saw 10. It provides a housing 12, a work surface 14 for placing a work piece that needs to be sawn, a saw blade 16, an output unit 18 with a LCD-display and an input unit 20.

Figure 2:
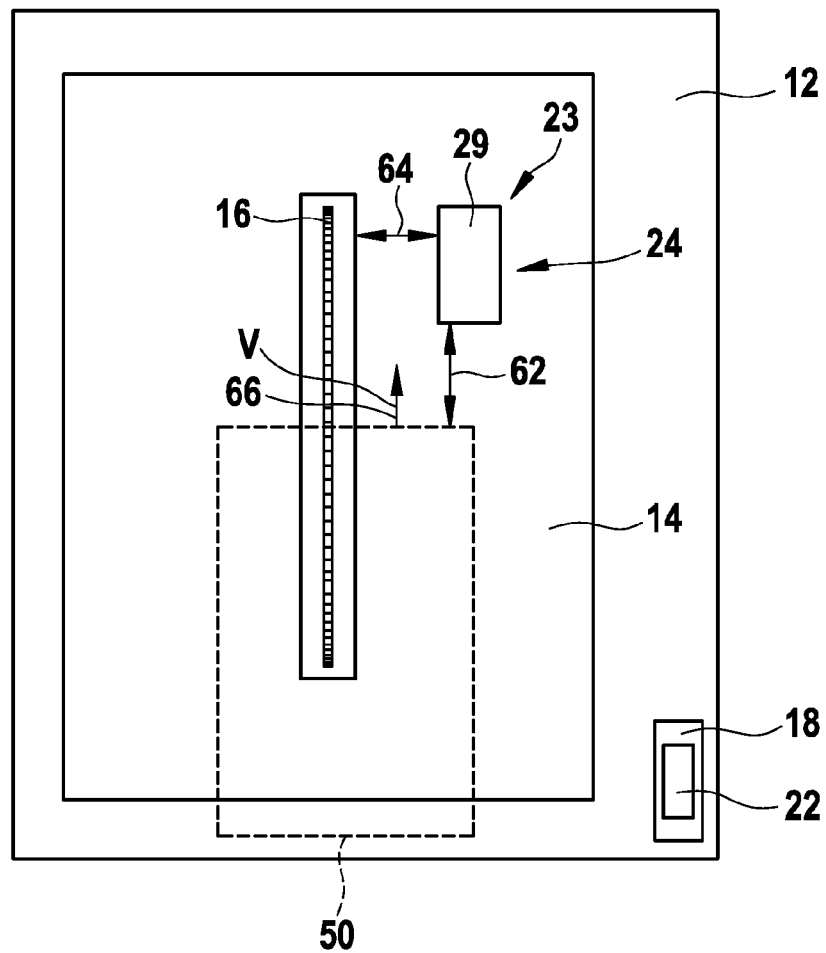
FIG. 2 is the circular saw with a signal unit in a top view.

FIG. 2 shows the circular saw 10 in a top view. Noticed can be the housing 12, the work surface 14, the output unit 18 and the saw blade 16. The output unit 18 is provided with a loud speaker 22. The input unit 20 and the output unit 18 are parts of the machine tool monitoring device 23, which provides also an ultra wide band signal unit 24.

With the aid of the signal unit 24 different monitoring functions can be realized when processing a work piece. The construction and the functioning of the signal unit 24 are explained in FIG. 3.

Figure 3:
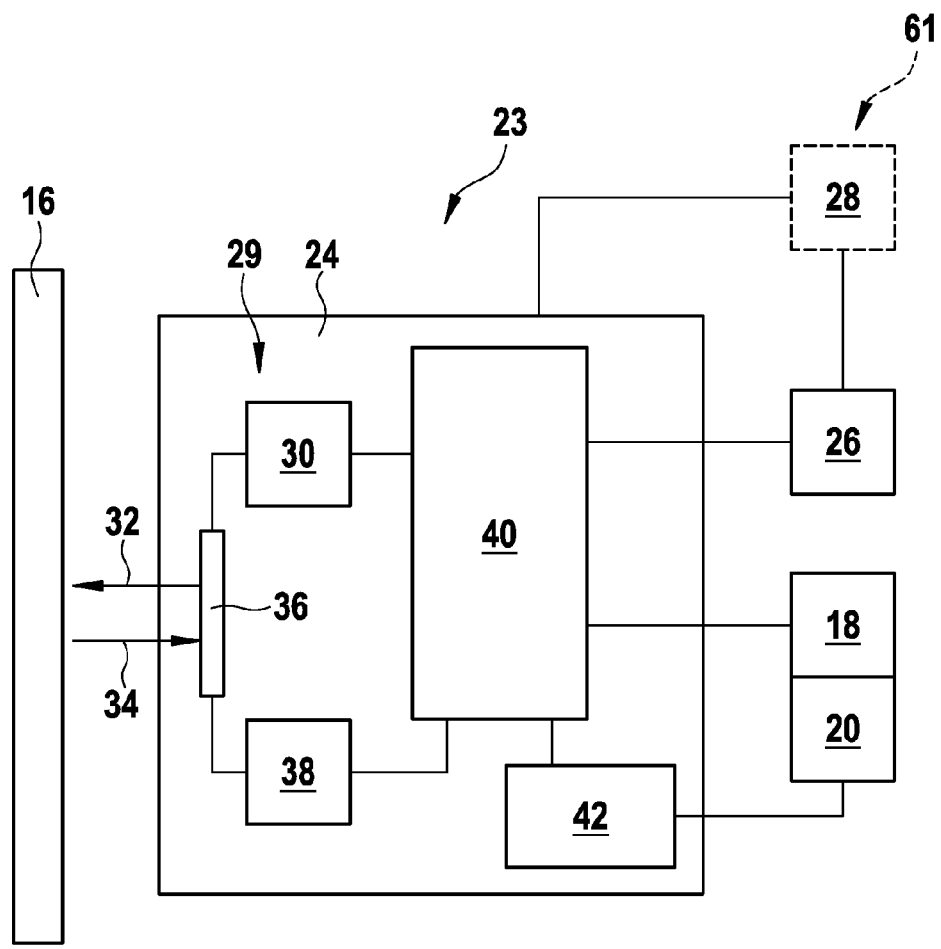
FIG. 3 shows schematically an illustration of the signal unit.

FIG. 3 shows the machine tool monitoring device 23 with the signal unit 24, the input unit 20, the output unit 18 and a regulating 26. Furthermore a control unit 28 of the circular saw 10 is shown by a dotted line. The signal unit 24 provides an ultra wide band radar sensor 29 with a transmitting unit 30, which is provided for producing an ultra wide band transmitting signal 32. For sending the transmitting signal 32 and for receiving a receiving signal 34 the ultra wide band radar sensor 29 is provided with an ultra wide band antenna element 36. The antenna element 36 is arranged firmly in relation to the work surface 14. Alternatively to the antenna element 36 the signal unit 24 can provide a condenser unit. Therefore a condenser arrangement—for example between a metallic surface and the saw blade 16—can be simply created. After receiving the receiving signal 34 it will be filtered, intensified, transformed into a digital form in a signal editing unit 38 and subsequently given to an arithmetic unit 40 for procession. The signal unit 24 provides furthermore a storage unit 42, in which a data base 44 is stored with monitoring information. This data base 44, whose function is described below, can be programmed by an operator of the circular saw 10 with the aid of the input unit 20.

Figure 4:
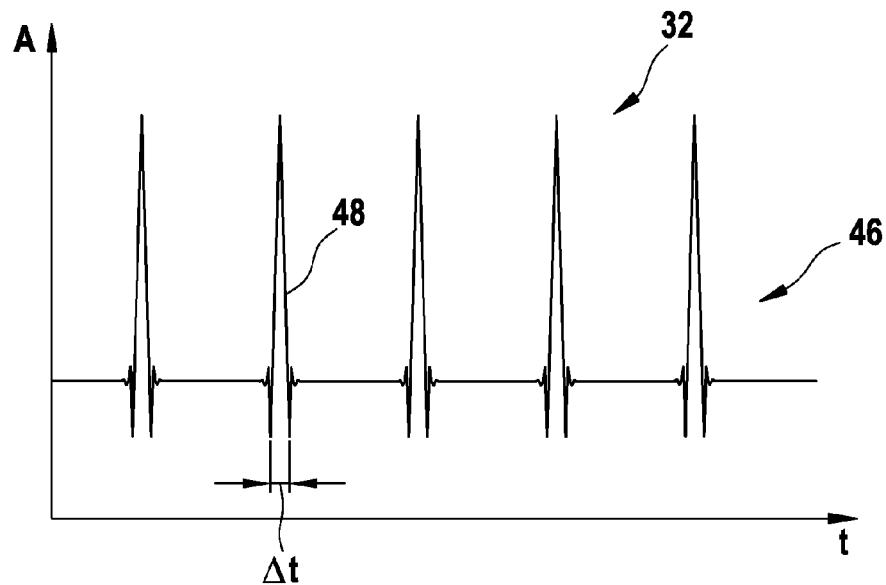
FIG. 4 is a wide band signal that is produced by the signal unit in a signal-amplitude image.
Figure 5:
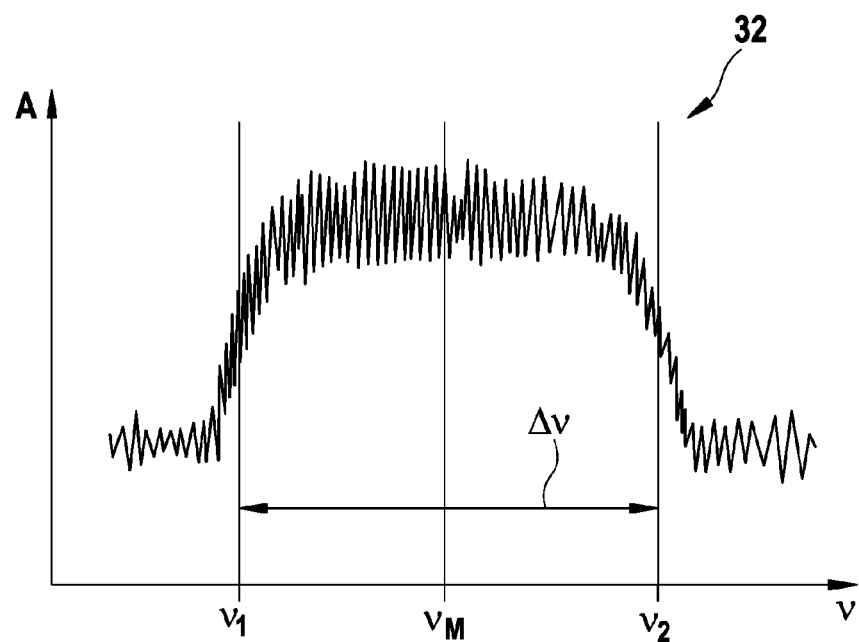
FIG. 5 is the signal in an amplitude-frequency image.

The production of an ultra wide band signal is explained by FIGS. 4 and 5. FIG. 4 shows the amplitude A of the transmitting signal 32 on the ordinate and the time t on the abscissa. The transmitting signal 32 provides a series 46 of pulses 48, whereby the pulses 48 are each transferred with a pulse duration $\Delta t$ of 0.5 ns and follow each other regularly. The pulse duration $\Delta t$ is connected with a signal band width $\Delta v$ of the transmitting signal 32, which is shown in FIG. 5. The spectrum of the transmitting signal 32 is shown in this figure, whereby the amplitude A is shown on the ordinate and the frequency v on the abscissa. The transmitting signal 32 is transferred with a center frequency $V_M$ of 5 GHz and a signal band width $\Delta v$ of 2 GHz around the center frequency $V_M$. An under frequency amounts to $v_1$=4 GHz and an upper frequency to $v_2$=6 GHz. Alternatively for producing pulses 48 further producing procedures of ultra wide band signals that are considered as useful by the expert are possible. The transmitting signal 32 is furthermore transferred with a transmission power below −45 dBm, so that undesired interferences with further wireless units can be prevented.

Figure 6:
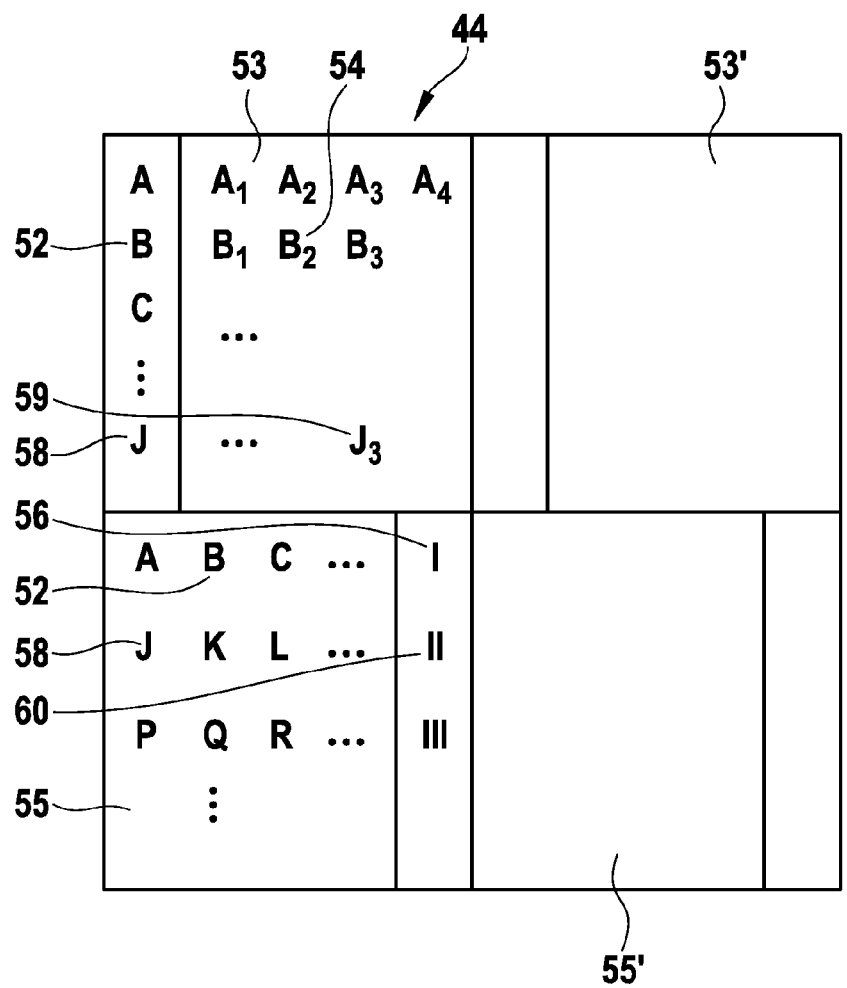
FIG. 6 is a data base of the signal unit.

It is assumed that an operator wants to carry out a sawing of a work piece 50, which is shown by a dotted line in FIG. 2. Therefore the work piece 50 is placed on the work surface 14. This application situation is called application situation 52. The placing of the work piece 50 induces a change of the dielectric, which surrounds the signal unit 24 and which is reflected in a change of the receiving signal 34. The arithmetic unit 40 assigns this detected received signal 34 to the application situation 52. This takes place with the aid of the data base 44, which is shown in FIG. 6. In the data base 44 signal pattern, as for example $A_3$, $B_2$ and so on are each assigned in an assignment chart 53 to an application situation A or B and so on. It is assumed in the considered embodiment that the application situation 52, which has to be detected by the arithmetic unit, corresponds with the entry B in the data base. Based on the detected receiving signal 34 the arithmetic unit 40 examines a correlation between the receiving signal 34 and the signal pattern, until a signal pattern 54 is determined, which has the greatest correlation with the detected receiving signal 34. It is assumed in the considered embodiment that this signal pattern 54 corresponds with the entry $B_2$ in the data base 44. The determination of the signal pattern 54 is carried out with the aid of the fuzzy logic. In a further assignment chart 55 in the data base further application situations A, B, C and so on are assigned to procedures I, II, II and so on for the work piece processing. If an application situation is detected by the arithmetic unit 40, it can be reacted upon this application situation if necessary by modifying a course of the work piece processing by a control unit 28, which is connected with the arithmetic unit 40, according to the procedure. The application situation 52 is assigned in the considered embodiment to a procedure 56, which corresponds with the entry I in the data base. At this procedure 56 the operation of the circular saw 10 is continued unmodified.

The signal unit 24 serves also for a material distinction. By evaluating the frequency spectrum of the receiving signal 34 it can be distinguished between material types, like in particular wood, metal or plastics. The placing of a work piece made of a specific material is registered as an application situation in the data base 44.

The signal unit 24 is furthermore construed for detecting human or animal tissue with the aid of this spectral evaluation of the receiving signal 34. Thereby a distinction can be made between a processed material and human or animal tissue. It is hereby assumed that a finger of the operator is approaching the saw blade 16. This is reflected in the spectrum of the receiving signal 34 by multiple resonance frequencies, which characterize human tissue. This application situation is called application situation 58, which is recognized by the arithmetic unit 40 with the aid of the detected receiving signal 34 by determining a correlated signal pattern 59. The application situation 58 is assigned in the data base 44 to a procedure 60, at which a security measure is initiated. The machine tool monitoring device 23 provides therefore an actuator engineering unit 61, which has a functional connection with the signal unit 24. This actuator engineering unit 61 is created in the considered embodiment by the control unit 28. By detecting the application situation 58 the signal unit 24 transfers a signal to the actuator engineering unit 61, which carries out a security switch-off of the operation of the circular saw 10 with the aid of this signal. Further embodiments of the actuator engineering unit 61 are possible. The actuator engineering unit 61 can for example be provided for driving security measures, which serve for breaking, covering and/or removing the saw blade 16 from a danger zone, as for example by sinking it into the housing 12.

Besides further signal pattern can be considered for detecting application situations. Signal patterns can be for example a specific displacement speed of a resonance frequency in the spectrum of the receiving signal 34, whereby a "slow" and a "fast" displacement can each be assigned to an application situation.

With the aid of the input unit 20 an operator can carry out a configuration of the data base 44. The operator can especially adjust the data base 44 to new applications of the circular saw 10, as for example when using further saw tool or novel equipment, and/or he can adjust new approaches, which are assigned to the specific application situations. Entries can be modified in the assignment charts 53 and 55, and/or new assignment charts 53' and 55' can be created. In order to increase the data base 44 with new application situations and new procedures for these application situations a learning mode of the circular saw 10 is provided. In this mode application situations can be created by the operator purposely, whereby the arithmetic unit 40 can learn autonomously how to detect such application situations and to determine which procedures are adjusted to these application situations. The arithmetic unit 40 learns thereby to correlate these application situations with one or several signal patterns. The arithmetic unit 40 works therefore in this mode on the basis of a neuronal logic, which allows such a self-learning function. The operator can adjust a security level at all times until a desired procedure for a specific application situation is achieved. This can be automatically stored in the data base 44.

With the aid of the arithmetic unit 40 furthermore a distance can be determined. Therefore the arithmetic unit 40 can detect a duration between the production of the transmitting signal 32 and the receiving of the receiving signal 34, as for example by carrying out a phase comparison between the transmitting signal 32 and the receiving signal 34. When processing the work piece a distance 62 to the work piece 50 as well as a distance 64 to the saw blade 16 is determined. By determining a distance 62 a work progress at the processing of the work piece 50 can be monitored. Personal injury due to an imbalance of the saw blade 16 can be avoided by monitoring the distance 64 because abnormal vibrations of the saw blade 16 are detected and of because the control unit 28 carries out a reduction of the engine speed of the saw blade 16. By evaluating frequency and/or phase displacements between the transmitting signal 32 and the receiving signal 34 a speed V can be monitored, with which the work piece 50 is pushed in the working direction 66. This information can also serve for monitoring the work piece processing progress. Additionally different work phases of a work piece processing can be defined, whereby specific monitoring functions are adjusted to theses work phases. In the starting phase after placing the work piece 50 especially the position of the work piece 50 in relation to the saw blade 16 can be monitored. At the end of the work piece processing the monitoring criteria of a finger position in relation to the saw blade 16 can be particularly tightened.

Furthermore work parameters for a work piece processing can be adjusted by the input unit 20, as for example an engine speed of the saw blade, a saw depth 68 (FIG. 1), a type of a saw blade and so on. Work parameters, as for example the saw depth 68, which are monitored by the machine tool monitoring device 23, can be kept by the regulating unit 26 at a value that is adjusted by the operator. With the aid of the output unit 18 the operator can be informed about the monitored work parameters. These can be shown on the LED-display. If a work parameter reaches a pre-adjusted threshold and/or at specific application situations, as for example when placing a work piece upside down, the operator can be informed by an acoustic signal, which is transferred over the loud speaker 22. By evaluating the ultra wide band receiving signal 34 a measurement and/or a monitoring of further work parameters is possible, as for example a dimension, a humidity level of a work piece and so on.

Figure 7:
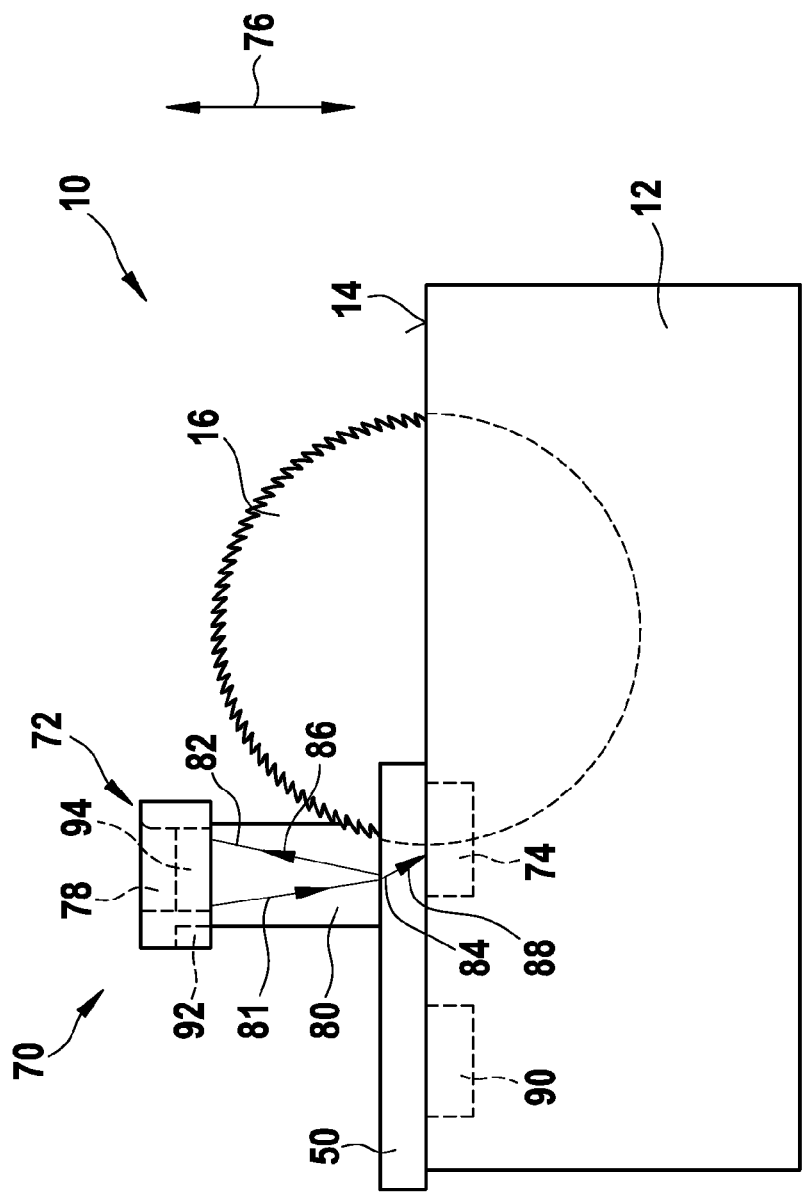
FIG. 7 is the circular saw with an alternative signal unit.

FIG. 7 shows the machine tool that is designed as a circular saw 10 with a further embodiment of a machine tool monitoring device 70. Like in the above embodiment the machine tool monitoring device 70 provides a signal unit 72, which is provided for an ultra wide band operation. The signal unit 72 comprises a first ultra wide band radar sensor 74, which is arranged in the basic assembly position of the circular saw 10 below the horizontally pointed work surface 14 for placing the work piece 50, as it is shown in FIG. 7. The ultra wide band radar sensor 74 is hereby arranged invisibly for the operator within the housing 12, which is construed preferably as a plastic housing and covered by the work surface 14 in vertical direction upwards. Due to this hidden arrangement undesired manipulations of the end user can be advantageously avoided. The signal unit 72 provided furthermore a further sensor 78, which is also construed as ultra wide band radar sensor. This sensor 78 is arranged in the basic assembly position of the circular saw 10 above the work surface 14. The projection of the sensor 78 in vertical direction 76 on the work surface 14 is hereby embedded on the work surface 14. Summed up the ultra wide band radar sensor 74 and the further sensor 78 are arranged in the basic assembly position of the machine tool that is designed as a circular saw 10 on both sides of the work surface 14. The sensor 78 and the ultra wide band radar sensor 74 are hereby separated from each other by the work surface 14. The sensor 78 is held in its position above the work surface 14 with the aid of a holding device 80.

Here and in the entire text the terms "upwards, downwards, above, below and so on" refer to the shown basic assembly position of the circular saw 10 that is shown in FIGS. 1 and 7.

In the considered embodiment of FIG. 7 a transmitting signal 81 is radiated from the sensor 78 downwards in the direction on the work surface 14. A signal part 82 can be reflected at the first interface between air and medium of the work piece 50 depending on the material of the work piece 50 and/or a signal part 84 can be transmitted by the medium of the work piece 50. The signal part 82 provides a radiation direction 86, which has a vertical component that is pointed upwards. The signal part 82 is hereby detected by the sensor 78. The signal part 84 provides a radiation direction 88, which has a vertical component that is pointed downwards. The signal part 84 is hereby detected after a transmission by the medium of the work piece 50 with the aid of the ultra wide band radar sensor 74 that is arranged below the work surface 14. Summed up the ultra wide band radar sensor 74 and the further sensor 78 create a sensor system, which is construed for detecting at least the signal parts 82, 84, which provide two different radiation directions 86, 88 due to a reflection on the work piece 50 or a transmission by a work piece 50.

In the shown embodiment the ultra wide band radar sensor 74 and the further sensor 78 are each provided for sending and for receiving a signal. It is hereby possible that the transmitting signal 81 is send alternatively or additionally by the ultra wide band radar sensor 74, whereby a signal part that is reflected on the work piece 50 is again detected by the ultra wide band radar sensor 74 and a signal part that is transmitted through a work piece 50 is received by the sensor 78. It is possible in an alternative embodiment that the sensor 78 is only construed for sending and that the signal unit 72 provides additionally a further sensor above the work surface 14, and in particular a sensor, which is construed for receiving a part of the transmitting signal 81 that is reflected on the work piece 50. The above and the following description can basically be applied in the case that the ultra wide band radar sensor 74 and the sensor 78 are exchanged with each other.

The machine tool monitoring device 70 provides in addition to the ultra wide band radar sensor 74 and the further sensor 78 that create the sensor system a further sensor 90. This sensor 90 is in particular construed as capacitive sensor. Alternatively the sensor 90 can be construed as inductive or as mechanic sensor. It can detect the presence of the work piece 50 on the work surface 14 and/or a body part of the operator in the danger zone of the saw blade 16 and supports thereby the above described sensor system in its monitoring function. The sensor 90 can for example be used to avoid false trips of the actuator engineering unit 61 (see FIG. 8) that has a functional connection with the signal unit 72 for carrying out a security measure, as for example the control unit 28. A triggering of the actuator engineering unit 61 can hereby for example only take place when a detection signal of the sensor system and the sensor 90 are present.

The machine tool monitoring device 70 provides in the shown embodiment a further sensor 92, which is provided for detecting an infrared radiation. With the sensor 92 the presence of human tissue in a danger zone of the circular saw 10 can be recognized with the aid of the detection of a temperature parameter. Furthermore the temperature of a saw cut can be detected by the sensor 92. In a further embodiment it is possible that the sensor 92 is construed as image detection unit, as for example a video camera, which supports the ultra wide band sensor system of the signal unit 72 in a material distinction, in particular in the detection of the presence of human tissue in a monitored area. A combined use of an infrared sensor and an image detection unit is also possible. The sensor 92 can also be used as redundant detection sensor for avoiding false trips of the actuator engineering unit 61.

The shown embodiment with two sensors 90 and 92 in addition to the ultra wide band sensor system is exemplary. An embodiment of the machine tool monitoring device 70 with the sensor system and only an additional sensor 90 and 92 is possible. The signal unit 72 provides furthermore a unit 94, which can also be used optionally and serves for bundling the transmitting signals 81 that have been emitted by the signal unit 72. Thereby the monitoring can reach a range of the circular saw 10, which is limited purposefully to a potential danger zone. The unit 94 provides therefore preferably at least one lens element, which is construed specifically for diverting electromagnetic waves in the radar range. This lens element can in particular be construed as a lens, in particular a curved component made of plastic, which uses a particular transitional value between the dielectric constants of air and plastic for diverting a radiation in the desired wave length range. The lens element can in particular be construed in one piece with the housing of the sensor 78. The transmitting signal 81 can furthermore be pointed purposefully on a potential danger zone by a special orientation of the antenna of the sensor 78. If the ultra wide band radar sensor 74 or the sensor 78 are construed as antenna array, a bundling of a radiated signal can be achieved, if a phase displacement tool is provided, which controls between the individual antenna elements 36 for controlling the relative phase positions. A focusing on a body part as well as a tracking of this body part can furthermore take place with the aid of the unit 94 after detecting a human body part as for example a finger in a danger zone.

Figure 8:
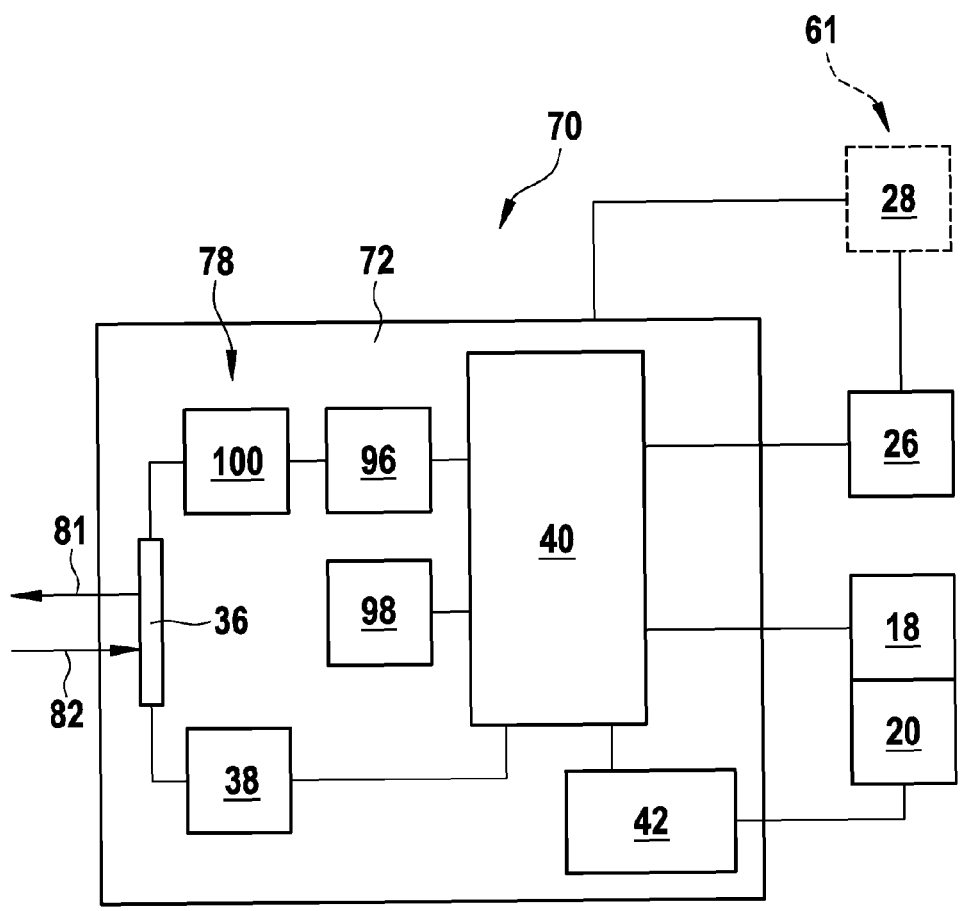
FIG. 8 shows schematically an illustration of the signal unit from FIG. 7.
Figure 9:
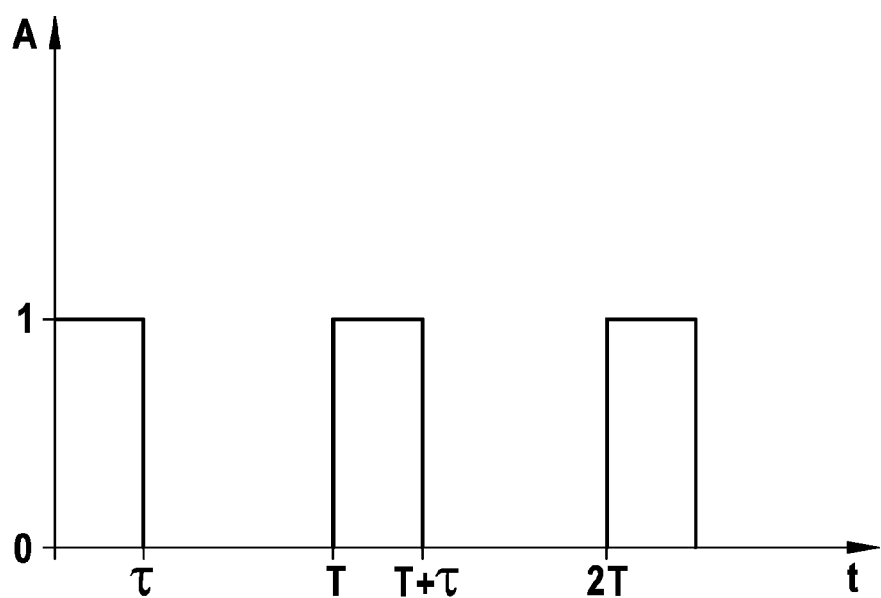
FIG. 9 shows the determination of a duty cycle for a transmitting signal of the signal unit from FIG. 7.

The above description of FIG. 3, which concerns the functioning of the signal unit 24 with the ultra wide band radar sensor 29, is also applicable for the signal unit 72 with the sensor 78. This is shown in FIG. 8. Components, which have the same function, are hereby labeled with the same reference signs. The following description is confined to the differences to the embodiment in FIG. 3. The signal unit 72 provides a tool 96, which determines a duty cycle for the transmitting signal 81 in an energy saving mode. This is shown in FIG. 9. Based on the point of time t=0 the transmitting signal 81 is created during a duration $\tau$ as described above for example with the aid of a series of pulses with a short pulse duration. After the time $\tau$ and until the point of time t=T, which means during a duration T−t, a sending of the transmitting signal 81 is blocked. From the point of time t=T the cycle is repeated with the period T, by releasing the transmitting signal 81 for a duration $\tau$ one more time and so on. With the aid of the tool 96 the duty cycle $\tau/T$ or $(T-\tau)T$ can be adjusted in such a way that prescribed values of the electromagnetic compliance (EMC) are complied with and a sufficient security is still achieved. In order to keep the energy consumption low the signal unit 72 can be activated not until the circular saw 10 is switched on and/or a manual starting of a drive of the saw blade 16 takes place and/or the presence of the work piece 50 is detected by the sensor 90.

The signal unit 72 is furthermore provided with a further unit 98, which is designed for carrying out a "listen-before-talk" function. Before starting a drive of the saw blade 16 and a monitoring operation of the signal unit 72 the useful frequency range of the sensor 78 is searched by this unit 98 for further services, as for example a GSM- or UMTS-service. If such an external service is detected, measures can be undertaken, which are construed for protecting the external service or the signal unit 72.

The machine tool monitoring devices 23, 70 can be advantageously used at further stationary machine tools, as for example band saws, chop saws, plane and so on. Furthermore the use of the machine tool monitoring device is also possible at hand-operated machine tools, as for example circular saws, jig saws, chain saws and so on. The machine tool monitoring device can thereby provide an advantageous protection by the signal unit at critical application situations, as for example a turning up of a hand-operated circular saw.

Figure 10:
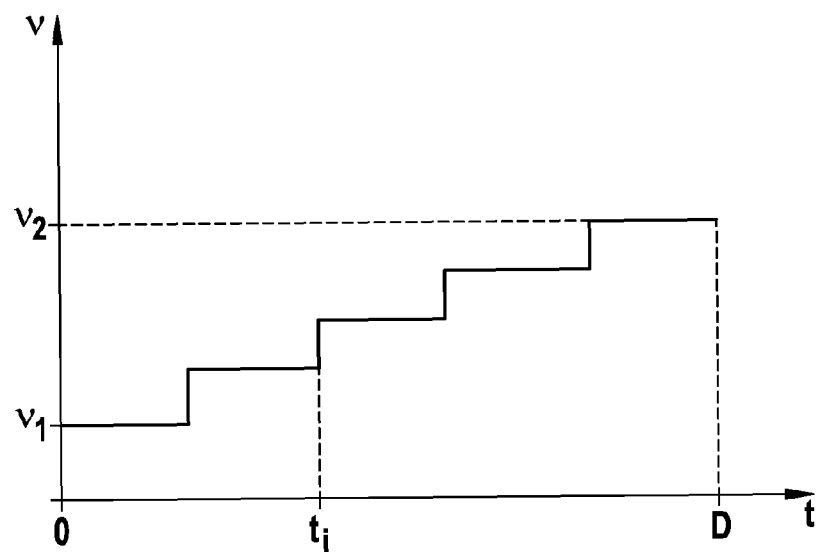
FIG. 10 is a stepped frequency modulation for a transmitting signal of the signal unit from FIG. 7.

FIG. 10 shows the production of the transmitting signal 81 that is send by the sensor 78. The signal unit 72 provides a sending unit 100, which is construed for producing the transmitting signal 81 with the aid of a stepped frequency modulation. The diagram that is shown in FIG. 10 shows the frequency V of the transmitting signal 81 as a function of the time t during a time sequence of the duration D. During the shown sequence, which is repeated, the frequency V is changed stepwise over the ultra wide band frequency range, which is spanned by the under frequency $V_1$ and the over frequency $V_2$, in particular stepwise increased, by incrementing the frequency V at discrete points of time $t_i$. This takes place with the aid of a not further shown oscillator, whose output frequency is incremented.

It is possible in a further embodiment that the ultra wide band radar sensor 74 or the sensor 78 provide several antenna elements 36, which are in an array arrangement. An array arrangement can be provided for example, in which antenna elements 36 are arranged on both sides of the movement plane, thus the rotation plane, of the tool that is construed as saw blade 16, whereby a monitoring area can be determined on the sides of the tool.

Figure 11:
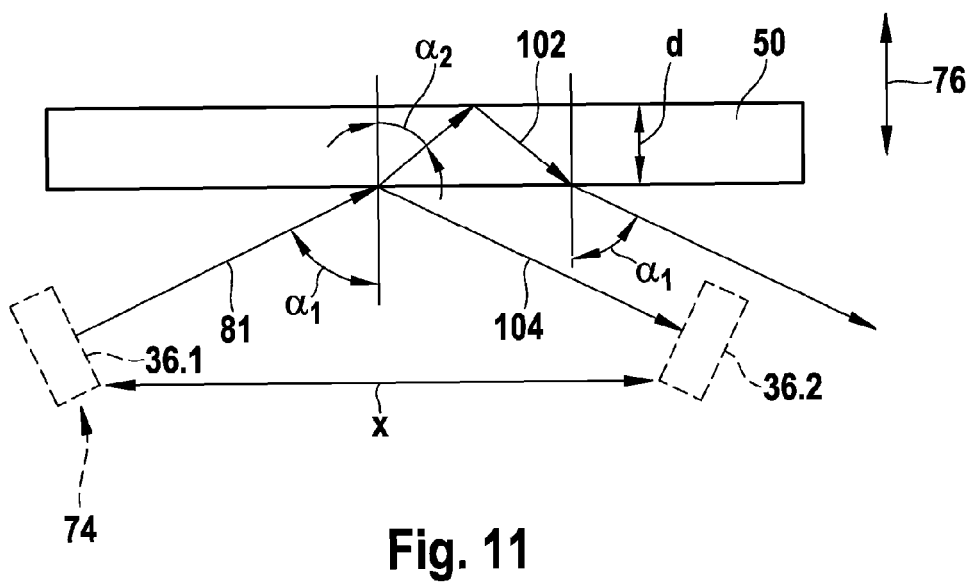
FIG. 11 shows the detection of the dielectric constant of a work piece.

FIG. 11 shows an embodiment of the signal unit 72, in which the ultra wide band radar sensor 74 has several antenna elements 36.1, 36.2, which are arranged below the work surface 14. In this example a first antenna array 36.1 sends the transmitting signal 81 with a direction, which is pointed tilted relative to the horizontal work surface 14. This allows especially the determination of the dielectric constant of a medium that is placed on the work surface 14, in particular the work piece 50. The transmitting direction of the antenna element 36.1 that is sending the transmitting signal 81 creates in a vertical plane, which corresponds with the drawing layer, an angle $\alpha_1$ with the normal to the work piece surface. A part of the transmitting signal 81 is reflected at a first interface between air and work piece 50, while a part is transmitted through the work piece 50. The transmitted jet creates hereby an angle $\alpha_2$ with the same normal to the work piece surface. The transmitted radiation part 102 is reflected in a second interface of the work piece 50 to the air. Due to the selected position of the antenna element 36.2 relative to the antenna element 36.1, thus for example of the horizontal distance X of the antenna element 36.2 to the antenna element 36.1, only the radiation part 104 is detected, which is reflected at the first interface. Thereby the reflection factor of the medium of the work piece 50 can be determined. By the determination of the reflection factor at different polarizations of the transmitting signal 81 the dielectric constant of the medium of the work piece 50 can be determined. This is determined with the aid of the arithmetic unit 40 of the signal unit 72. It is furthermore possible to displace the antenna element 36.2 in a horizontal direction in such a way that the antenna element 36.2 detects the radiation part 102, which is reflected at the second interface. By determining the displacement distance the angle $\alpha_2$ and therefore the diameter d of the work piece 50 can be determined. This is again determined with the aid of the arithmetic unit 40 of the signal unit 72. Alternatively or additionally the construction of the antenna element 36.2 with a receiving angle is also possible, which allows the detection of both radiation parts 102, 104. The transmitting signal 81 can hereby be construed as pulsed transmitting signal, whereby it can be distinguished between the two radiation parts by a duration detection of the transmitting signal 81. Furthermore the use of an additional antenna element 36 is possible, which is construed for detecting the radiation part 102 that is reflected at the second interface, whereby it can be again distinguished between the two radiation arts 102, 104.

The invention claimed is:

1. A machine tool monitoring device, comprising at least one signal unit for an ultra-wide band operation, the signal unit including:
    an ultra wide band radar sensor; and
    at least one further sensor, wherein the at least one further sensor is one of: a capacitive sensor; an inductive sensor; a mechanic sensor; and an optical sensor,
    wherein the ultra wide band radar sensor and the at least one further sensor are arranged in a machine tool basic assembly position on both a first and second side of a machine tool work surface for placing a work piece; and
    wherein the ultra wide band radar sensor and the at least one further sensor comprise a sensor system that is configured for detecting a first signal part that is transmitted through a work piece for processing and a second signal part that is reflected from the work piece for processing;
    a regulating unit configured to:
        accept threshold values for a plurality of work parameters from an operator related; and
        notify the operator with an acoustic signal when at least one of the plurality of work parameters reaches a corresponding threshold value;
    wherein the ultra wide band radar sensor is used to detect the plurality of work parameters simultaneously, the detected work parameters including at least one of a position of a work piece and a position of a tool portion of the machine tool, and
    wherein the ultra wide band radar sensor is used to detect at least one of: human and animal tissue in a predetermined danger zone via the at least one ultra wide band radar sensor.

2. The machine tool monitoring device of claim 1, wherein the at least one ultra wide band radar sensor is arranged in a machine tool basic assembly position below a machine tool work surface for placing a work piece.

3. The machine tool monitoring device of claim 1, wherein the at least one further sensor is arranged in a machine tool basic assembly position above a machine tool work surface for placing a work piece.

4. The machine tool monitoring device of claim 1, further comprising at least one additional sensor in addition to the sensor system.

5. The machine tool monitoring device of claim 1, further comprising a unit that is configured for bundling a radiation of the at least one signal unit.

6. The machine tool monitoring device of claim 1, wherein the at least one signal unit comprises a tool that determines a duty cycle for a transmitting signal in at least one energy saving mode.

7. The machine tool monitoring device of claim 1, wherein the at least one signal unit comprises a listen-before-talk function.

8. The machine tool monitoring device of claim 1, wherein the at least one signal unit is configured for processing a signal that has a series of pulses.

9. The machine tool monitoring device of claim 1, wherein the at least one signal unit is configured for producing a signal with the aid of a stepped frequency modulation.

10. The machine tool monitoring device of claim 1, wherein the at least one signal unit comprises an arithmetic unit that is configured to assign a detected signal to an application situation by a signal processing that is based on at least one of: a fuzzy logic; and a neuronal logic.

11. The machine tool monitoring device of claim 1, wherein the at least one signal unit comprises a data base, wherein an application situation is assigned in the data base to at least one signal pattern.

12. The machine tool monitoring device of claim 1, wherein the at least one signal unit comprises a programmable data base, wherein an application situation at a processing is assigned in the data base to a procedure for changing the processing.

13. The machine tool monitoring device of claim 1, wherein the at least one signal unit is configured for determining a work progress at a work piece processing.

14. The machine tool monitoring device of claim 1, wherein the at least one signal unit is configured for determining a distance.

15. The machine tool monitoring device of claim 1, wherein the at least one signal unit is configured for determining a speed of a work piece for processing.

16. The machine tool monitoring device of claim 1, further comprising an electronic output unit that is configured for an output of monitoring information to an operator.

17. The machine tool monitoring device of claim 1, further comprising an electronic input unit that is configured for an input of at least one monitoring information.

18. The machine tool monitoring device of claim 1, further comprising an actuator engineering unit for carrying out a security measure that is in a functional connection with the at least one signal unit.

19. The machine tool monitoring device of claim 1, wherein the at least one signal unit operates in at least one operating mode for an evaluation of at least one radiation from a group of at least two radiation parts, wherein the at least two radiation parts are spatially separated from each other due to a reflection of a signal at the at least two interfaces of a medium.

20. The machine tool monitoring device of claim 1, wherein the machine tool monitoring device is arranged on a machine tool.

* * * * *